(12) United States Patent
Gafni

(10) Patent No.: US 9,957,986 B2
(45) Date of Patent: *May 1, 2018

(54) STRUCTURAL ASSEMBLY AND METHOD OF ASSEMBLY THEREOF

(71) Applicant: I.G. CARDBOARD TECHNOLOGIES LTD., Tel Aviv (IL)

(72) Inventor: Izhar Gafni, Ahituv (IL)

(73) Assignee: I.G. CARDBOARD TECHNOLOGIES LTD., Tel Aviv (IL)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/202,528

(22) Filed: Jul. 5, 2016

(65) Prior Publication Data

US 2016/0312810 A1 Oct. 27, 2016

Related U.S. Application Data

(63) Continuation of application No. 14/848,117, filed on Sep. 8, 2015, now Pat. No. 9,422,955, which is a (Continued)

(51) Int. Cl.
*F16B 21/12* (2006.01)
*F16B 3/00* (2006.01)
(Continued)

(52) U.S. Cl.
CPC ............... *F16B 3/00* (2013.01); *B62K 19/02* (2013.01); *B62K 19/14* (2013.01); *B62K 19/18* (2013.01);
(Continued)

(58) Field of Classification Search
CPC .... B62K 2700/16; B62K 19/02; B62K 19/14; B62K 19/18; Y10T 403/4685;
(Continued)

(56) References Cited

U.S. PATENT DOCUMENTS 2,479,807 A 8/1949 Bertea
2,831,717 A 4/1958 Mayer
(Continued)

FOREIGN PATENT DOCUMENTS

AR 095458 A1 10/2015
DE 9210422 U1 * 11/1992 ............. B62K 13/00
(Continued)

OTHER PUBLICATIONS

Design Hobby (Video): "Ridable Cardboard Bicycle" (Izhar Gafni), 2012 (accessible at 'http://www.shejipi.com/9665.html', or 'http://v.youku.com/v_show/id_XNDM2MzE0Mzlw.html'.

*Primary Examiner* — Matthieu F Setliff
*Assistant Examiner* — Matthew R McMahon
(74) *Attorney, Agent, or Firm* — Kenealy Vaidya LLP

(57) ABSTRACT

Some embodiments are directed to an assembly having a first cardboard assembly member, a second cardboard assembly member and a connection arrangement. The connection arrangement can connect together the first and second cardboard assembly members, and can include a set of first connector elements and a set of second connector elements. Each of the first connector elements can have a first segment fixedly received within the first assembly member, and a second segment that projects from the first assembly member and received within the second assembly member, the second segment extending along a first longitudinal axis parallel to two parallel faces of the second assembly member. Each of the second connector elements can extend along a second longitudinal axis normal to the first longitudinal axis, and be received within the second assembly member and pass through the two parallel faces of the second assembly member.

9 Claims, 7 Drawing Sheets

Related U.S. Application Data continuation-in-part of application No. PCT/IL2014/050595, filed on Jul. 2, 2014.

(60) Provisional application No. 61/871,475, filed on Aug. 29, 2013.

(51) Int. Cl.
| | | |
|---|---|---|
| *B62K 19/02* | (2006.01) | |
| *F16B 17/00* | (2006.01) | |
| *B62K 19/14* | (2006.01) | |
| *B62K 19/18* | (2006.01) | |

(52) U.S. Cl.
CPC ............ *F16B 17/006* (2013.01); *F16B 21/12* (2013.01); *Y10T 403/4685* (2015.01)

(58) Field of Classification Search
CPC ........ Y10T 403/58; F16B 3/00; F16B 17/006; F16B 21/12
See application file for complete search history.

(56) References Cited

U.S. PATENT DOCUMENTS

| | | | |
|---|---|---|---|
| 2,893,298 A | | 7/1959 | Averette |
| 3,529,389 A | * | 9/1970 | Wilkins ................ E04B 1/6125 174/497 |
| 3,921,960 A | | 11/1975 | Bright |
| 4,057,217 A | | 11/1977 | MacDonald |
| 4,116,573 A | | 9/1978 | Fuchs |
| 4,146,223 A | * | 3/1979 | Stottman ................ A63D 1/04 144/346 |
| 4,261,665 A | | 4/1981 | Hsiung |
| 4,299,067 A | | 11/1981 | Bertschi |
| 4,389,808 A | * | 6/1983 | Podell .................... A63H 33/12 446/123 |
| 4,407,342 A | | 10/1983 | Deaner |
| 4,737,047 A | | 4/1988 | Oshita |
| 4,768,750 A | | 9/1988 | Wilson |
| 5,141,131 A | | 8/1992 | Miller, Jr. et al. |
| 5,363,625 A | | 11/1994 | Philippi |
| 5,468,086 A | | 11/1995 | Goya |
| 5,468,102 A | | 11/1995 | Stojanovski |
| 5,996,302 A | * | 12/1999 | Choisel ................. E04B 2/705 52/233 |
| 6,343,453 B1 | * | 2/2002 | Wright ..................... E04C 3/14 52/837 |
| 6,382,081 B2 | | 5/2002 | Tanaka et al. |
| 7,234,783 B2 | | 6/2007 | MacKarvich |
| 7,264,416 B2 | | 9/2007 | Kahl |
| 2005/0031408 A1 | | 2/2005 | Lemm |
| 2007/0269262 A1 | | 11/2007 | Bertsche |
| 2008/0155944 A1 | * | 7/2008 | Bertele .................. A47B 43/02 53/450 |
| 2010/0232872 A1 | | 9/2010 | Kato |
| 2011/0133427 A1 | | 6/2011 | Bashan et al. |
| 2012/0034029 A1 | | 2/2012 | Chen |
| 2013/0093161 A1 | | 4/2013 | Savsek et al. |
| 2015/0375822 A1 | | 12/2015 | Gafni |

FOREIGN PATENT DOCUMENTS

| | | | | |
|---|---|---|---|---|
| FR | 2 640 153 A3 | | 6/1990 | |
| GB | 171338 A | * | 11/1921 | ............... B62K 3/06 |
| JP | S4852241 U | | 7/1973 | |
| JP | 3-117476 A | | 5/1991 | |
| JP | H7-166610 A | | 6/1995 | |
| JP | H11-172781 A | | 6/1999 | |
| JP | 2000-142698 A | | 5/2000 | |
| JP | 2006124946 A | | 5/2006 | |
| JP | 2013527066 A | | 6/2013 | |
| WO | 9418868 A1 | | 9/1994 | |
| WO | 2007128415 A2 | | 11/2007 | |
| WO | WO 2009133275 A1 | * | 11/2009 | ............... B62K 3/02 |
| WO | WO 2013157771 A1 | * | 10/2013 | ............... B62K 3/02 |

\* cited by examiner

STRUCTURAL ASSEMBLY AND METHOD OF ASSEMBLY THEREOF

CROSS REFERENCE TO RELATED APPLICATION

This application is a continuation of U.S. application Ser. No. 14/848,117 filed Sep. 8, 2015, now U.S. Pat. No. 9,422,955 issued Aug. 23, 2016, which is a continuation-in-part of PCT Patent Application No. PCT/IL2014/050595, filed on Jul. 2, 2014, which claims the priority benefit under 35 U.S.C. § 119 of U.S. Provisional Application No. 61/871,475 filed Aug. 29, 2013, the contents of each of which are hereby incorporated by reference in their entireties.

TECHNOLOGICAL FIELD

The present disclosure relates to structural assemblies and method of assembly thereof, in particular, cardboard structures used for human powered vehicles.

GENERAL DESCRIPTION

The present disclosure provides an assembly or structure (to be referred to herein jointly, as "assembly") that comprises at least one first assembly member and at least one second assembly member, at least one first and at least one second assembly member constituting together an assembly pair that are attached to one another via a connection arrangement. Typically, at least one, and often both, of the two assembly members are made out of cardboard or comprise cardboard as their main component (i.e. at least 50%, at times at least 60%, 70%, 80% or even 90% of their weight is constituted by cardboard).

In an assembly of this disclosure, the different assembly pairs may be the same or may be different. For example, there may be one or more assembly pairs of one configuration, one or more assembly pairs of another configuration, etc. In addition, one or both of the assembly members of one assembly pair may be connected to one or more other assembly members and thus form part also of one or more other assembly pairs. For example, an elongated assembly member may be combined with another assembly member to form one assembly pair at its one end and connected to another assembly member to form another assembly pair at its other end. In addition, such an assembly member may also be connected at a mid-portion thereof to a further assembly member to form a third assembly pair. Thus, by this example, an assembly member may form together with three other members, three assembly pairs.

In this disclosure a distinction is also made between a "first assembly member" and a "second assembly member", the two being different from one another in the role they play in formation of the assembly pair and the nature of their engagement with the elongated connector elements that are defined below. It should be noted that this "first" and "second" definitions and the distinction between the two is made for reasons convenience and ease of reference within the context of this disclosure; but it does not confer any hierarchy of importance or assembly. It should further be noted that in the assembly of this disclosure, an assembly member that is a first assembly member in one assembly pair may serve the role of a second assembly member in another pair.

The connection arrangement of the assembly comprises one or more first elongated connector elements and one or more second connector elements. The first connector elements are each configured to project from a face of the first assembly member and to define a first axis extending away from said face. The axes of one or more first connector elements are substantially parallel to one another.

Each of said first connector elements has also at least one recess extending along a second axis that is normal to the first axis. In the assembly, the first connector elements are received within the second assembly member, and through their engagement with the second connector elements they are locked in position, such that detachment between the first assembly member and the second assembly member is blocked. For such engagement, the second connector element is inserted into the second assembly member, along one of the second axes, and is thereby received within at least one of the recesses formed in the first connector elements. Upon such reception, the second connector element engages the first connector element, locking it in position and thereby blocking detachment, as explained above.

By another aspect, the disclosure provides a method for assembly of a first assembly member to a second assembly member. For such assembly, the first assembly member is fitted with one or more elongated connector elements, each of which (i) extends along a first axis, (ii) has one or more recesses that extends along a second axis normal to the first axis, and (iii) projects from a face of said first assembly member, along said first axis.

Where there are more than one first connector element, all the first axes are parallel to one another. For assembly, the two assembly members are brought into proximity and the first connector element is inserted into the second assembly member, typically fitted into a pre-formed first bore in the second assembly member. Then one or more second connector elements are inserted into the second assembly member along said second axis, typically fitted into a pre-formed second bore in the second assembly member, to thereby be received within one or more corresponding recesses of the first connector element. This causes locking of the first connector element in position and prevents detachment between the two assembly members. Said connector elements may be further secured in position by use of adhesive or any other means.

While, as noted above, the first and second connector elements are typically received within respective first and second bores pre-formed in the second assembly member, it is also conceivable, in accordance with this disclosure, that the bores that accommodate the first and second connector elements are formed during the assembly process. For this purpose, the connector elements may be configured for forming such bores; for example, they have each a tapered end, whereby forcing of connector elements into the second assembly member will cause the bore to be formed, in the same manner as a nail that is being hammered into a substrate.

The first connector element may be a stand-alone element that is combined with the first assembly member prior to assembly; e.g. having a head and a shaft and received in a pre-formed bore in the first assembly member with a seat at the base, the shaft passing through the bore and the head being accommodate within the seat. Alternatively, the first connector element(s) may be integrally formed or pre-fixed or may be tightly associated with the first assembly member.

The assembly typically comprises two or more first connector elements, each of which is engaged with two or more second connector elements. The connector elements may be arranged in pairs, each pair engaged with the same two or more second connector elements. The assembly will, in many cases, comprise two or more pairs of first connector elements having first axes that are parallel to one another, as already explained above.

By one embodiment, the second assembly member is a generally elongated member with two end portions, and the first connector elements are received within the second assembly member through one of its two end portions. The second connector elements typically extend between two parallel faces of such second assembly member.

As can be appreciated, for best engagement, the shape of the recess will typically, although not exclusively, correspond in shape and size to the cross-sectional shape of the second connector element received therein.

It should be noted that, at times, the dimensions (length and diameter, as well as the cross-sectional shape) of different first connector elements may be different to one another; and similarly, also the second connector elements may have different dimensions (length, diameter and/or cross-sectional shape). Typically, albeit not exclusively, the connector elements have a circular cross-section.

The connection arrangement of the assembly described herein, is suitable particularly for use in an assembly pair where at least one and usually both of its first and second assembly members are made of cardboard. One example for such a connector element is its use in construction of a bicycle, particularly cardboard bicycles of the kind disclosed in PCT publication numbers WO 2011/067742, WO 2014/061012, WO 2014/141228, WO 2014/178038, and co-owned (yet to publish) PCT application PCT/IL2014/104701. For example, the connection assembly of the present disclosure may be utilized for connecting a head tube of a bicycle with the frame of the bicycle.

The connector elements may be made from a variety of materials, such as wood, plastic or cardboard.

BRIEF DESCRIPTION OF THE DRAWINGS

In order to better understand the invention as disclosed herein and to exemplify how it may be carried out in practice, embodiments will now be described, by way of non-limiting example only, with reference to the accompanying drawings, in which.

DETAILED DESCRIPTION OF EMBODIMENTS

As noted above, the connection arrangement of this disclosure may be used to form various assemblies; one, non-limiting example being a frame of a cardboard bicycle, in which case the assembly pair is constituted by two structural members of the bicycle.

Figure 1:
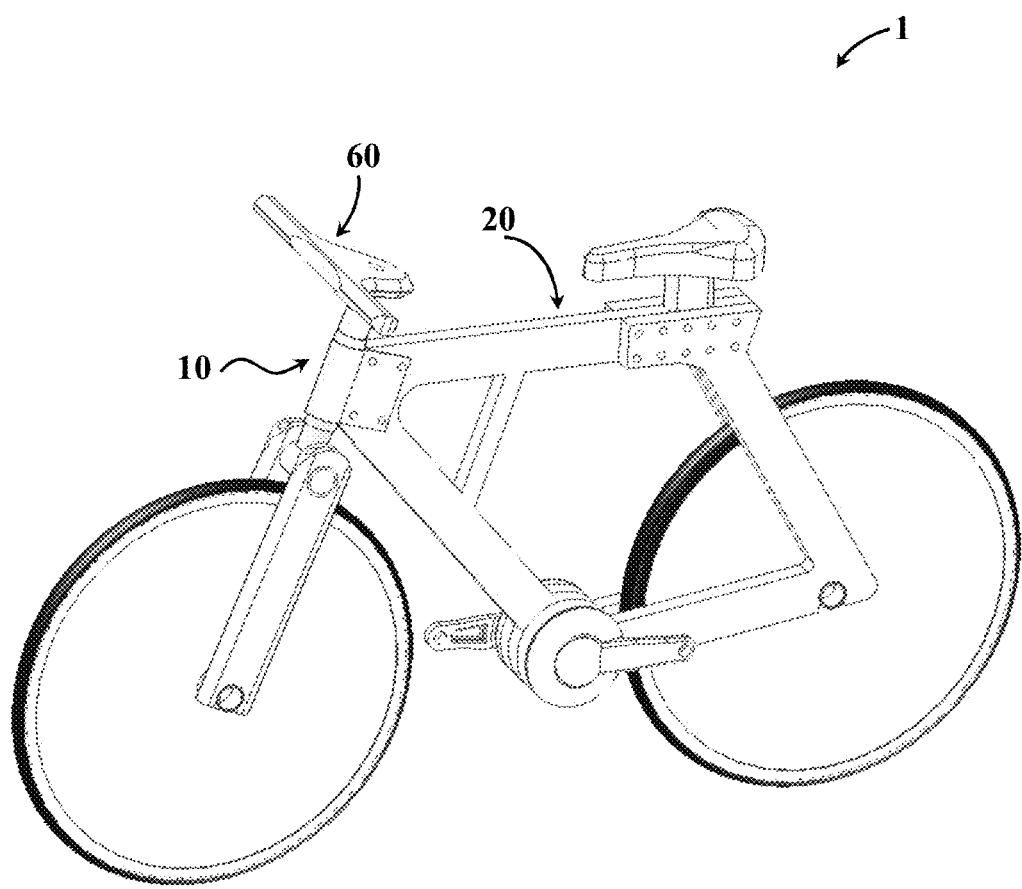
FIG. 1 is a schematic isometric view of a bicycle comprising the assembly of the subject matter of the present application.
Figure 2:
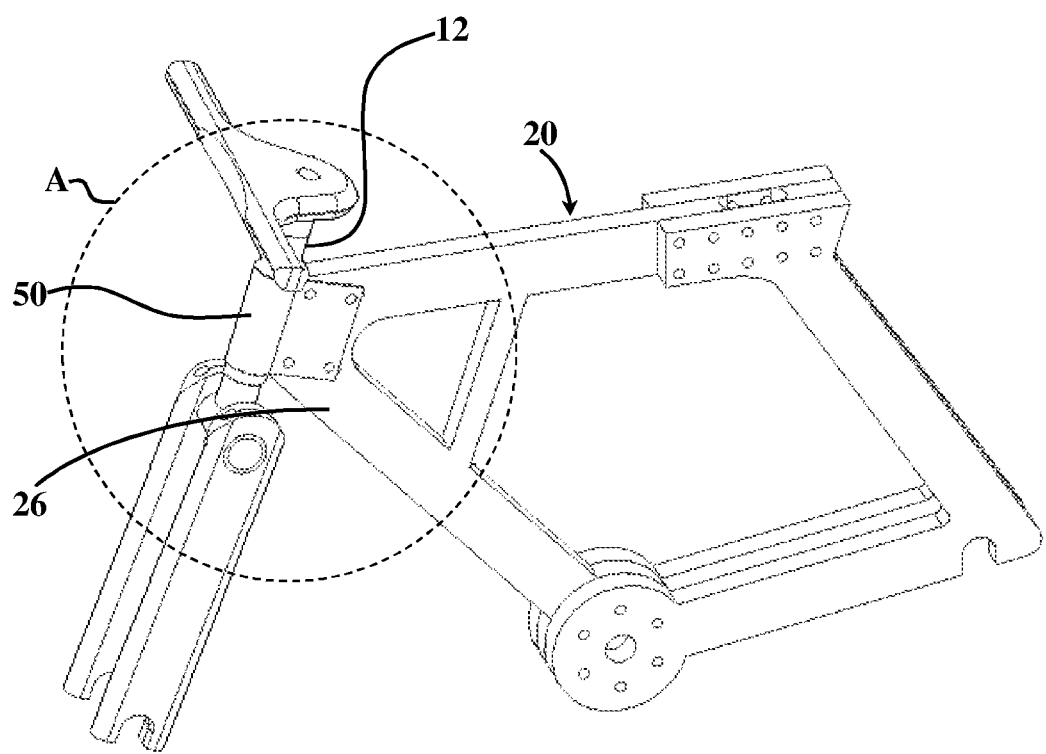
FIG. 2 is a schematic isometric view of certain elements of the assembly shown in FIG. 2.
Figure 3:
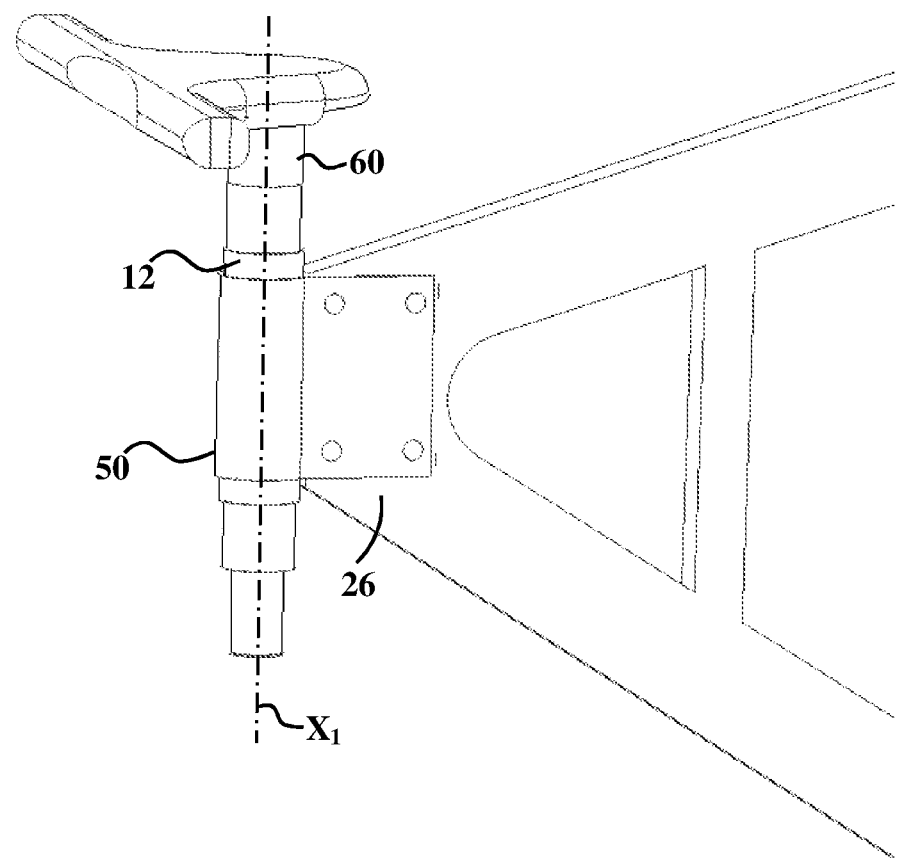
FIG. 3 is a schematic enlarged view of detail A shown in FIG. 2.

Attention is first drawn to FIG. 1 in which a bicycle is shown, generally designated 1, and comprising a base frame 20, a handlebar 60 and head tube 10 articulated to the base frame 20 by the assembly of the present disclosure and constitute together an assembly pair. The head tube 10 is configured for receiving therethrough a shaft of the handlebar 60 to allow it to pivot in order to steer the bicycle 1. The head tube 10 and the frame 20, as will be clear from the description below, are connected to one another by means of a connecting arrangement according to this disclosure and serving the respective roles of the "first assembly member" and the "second assembly member".

As previously described in co-owned WO 2011/067742 and (yet to publish) PCT application PCT/IL2014/104701, bicycles can be made mainly of cardboard, and the above assembly can be particularly useful for such a type of bicycles. The frame elements may of the kind disclosed in Applicant's PCT applications WO 2014/061012, WO 2014/141228, and WO 2014/178038. However, it is appreciated that this type of assembly is not limited to cardboard bicycles and can similarly be applied in other constructions.

With particular reference being made to FIGS. 2 to 7, the head tube 10 comprises a hollow tube 12 which extends along a longitudinal axis $X_1$ which is generally of vertical orientation when the bicycle is positioned on a reference surface such as the ground, the cavity 17 (better seen in FIG. 6) of the tube being configured for receiving therein the handlebar shaft.

Figure 4:
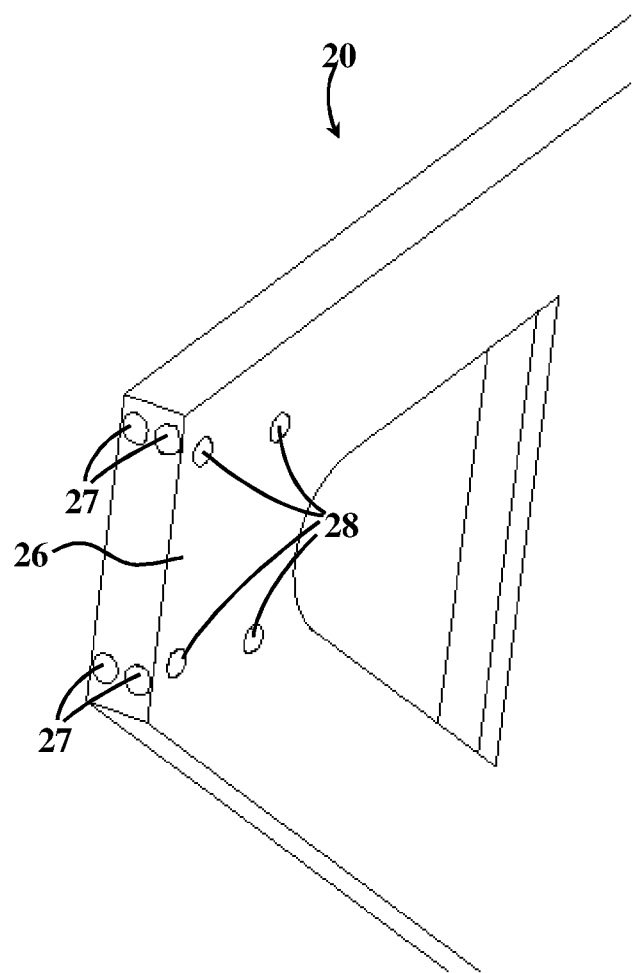
FIG. 4 is a schematic isometric view of the base frame.

In this specific example, as can be better seen in FIG. 4, the base frame 20 constitutes the second assembly member. The front frame portion 26 comprises a first set of pre-formed first bores 27 configured for receiving therein a corresponding segment of the first connector elements 34, and a second set of pre-formed bores 28 configured for receiving therein the second connector elements 32, as will be described below.

It is noted that the first bores 27 extend generally parallel to a plane defined by the base frame 20 while the second bores 28 extend perpendicular to this plane and pass through the front frame portion 26.

Figure 5:
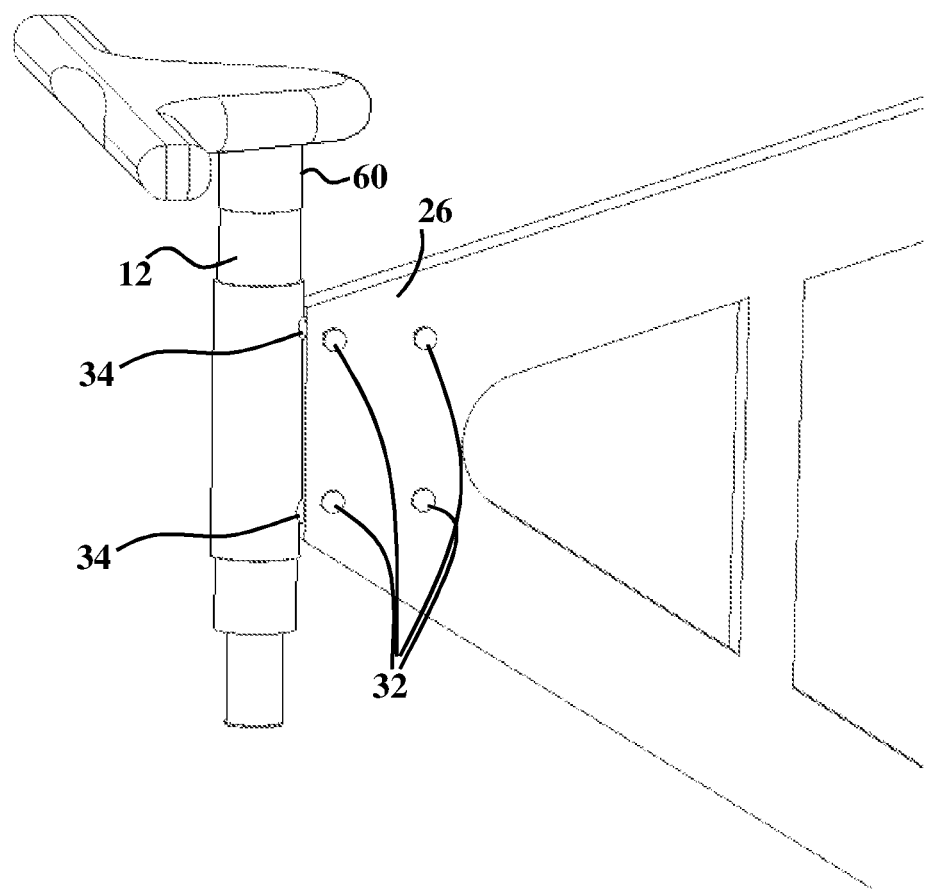
FIGS. 5 to 7 are schematic isometric view of detail A shown in FIG. 3, with some of the components gradually stripped away for a clearer presentation of the assembly.
Figure 6:
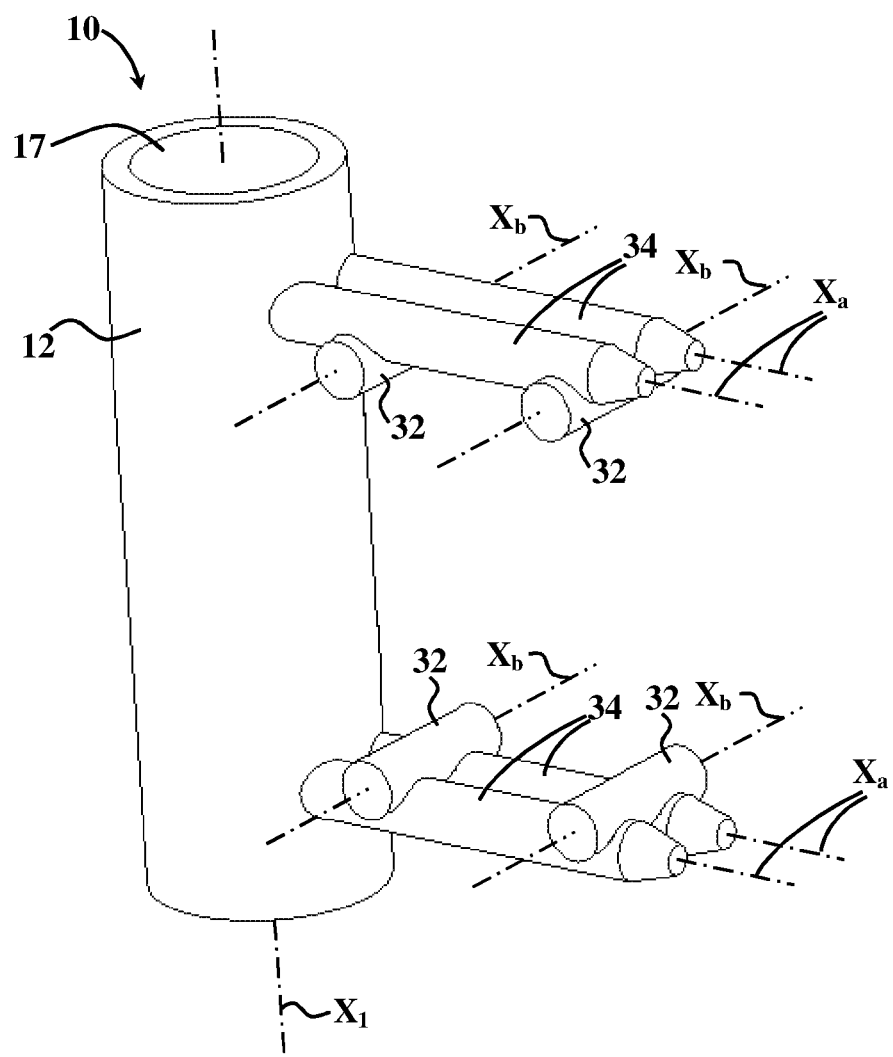
Figure 7:
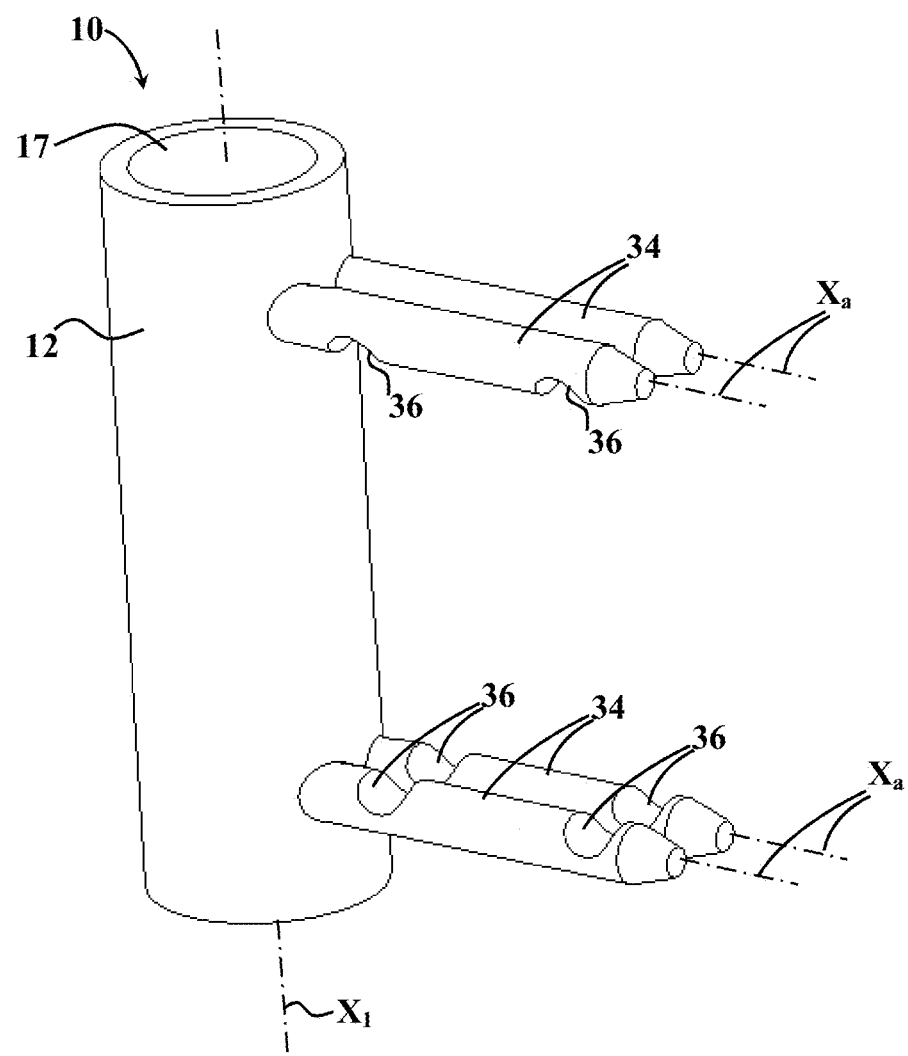

Reverting now to FIGS. 5 to 7, in assembly, the head tube 10, constituting the first assembly member, is provided with a plurality of (in this case four) first connector elements 34, which are fitted to be partially received within the hollow tube 12 and protrude therefrom in a direction generally perpendicular to the main axis $X_1$. Each of the first connector elements 34 has a longitudinal axis Xa and comprises two spaced apart recesses 36, which extend parallel to an axis Xb, which is normal to axis Xa.

The first connector elements 34 are configured for engagement with a plurality (e.g. four) of second connector elements 32 (shown FIG. 6) via recesses 36. The recesses 36 have a circular cross-section, and are configured to be complimentary to the cross-section of the second connector elements 32 which should be received therein.

It is noted that while the connector elements 32, 34 described above are shown to have a circular cross-section, this is not compulsory and connector elements of other cross-sections (e.g. triangular, rectangular, oval etc.) can be contemplated. It should also be appreciated that the cross-sectional shape the connector elements can differ from one connector element to the other, although typically the cross-sectional shape of the recesses is designed to be complimentary to the cross-sectional shape of that of the second connector element with which it is engaged.

For assembly, the head tube 10 (i.e. the first assembly member) together with the first connector elements 34 extending perpendicular from a face of the head tube, is brought into proximity with the base frame 20 (i.e. the second assembly member). The first connector elements 34 are inserted into the first pre-formed bores 27 until the recesses 36 are aligned with the second pre-formed bores 28 that extend along axis Xb. In this position, the second connector elements 32 can be inserted into the second bores 28 in the Xb direction, passing through the front frame portion 26.

Once inserted, a portion of each of the second connector elements 32 is received within the recesses 36 of the first connecting element 34, thereby preventing extraction of the first connector elements 34 from the front frame portion 26 along the longitudinal axis Xa, and consequently, preventing detachment between the head tube 10 and the base frame 20.

In order to reinforce the connection between the base frame 20 and the head tube 10, an optional auxiliary connecting member 50 is provided embracing both the head tube 10 and a part of the front frame portion 26, completely covering the second bores 28, thereby preventing the second connector elements 32 from being extracted from the front frame portion 26. The auxiliary connecting member 50 can be attached to the head tube 10 and base frame 20 by any known way, e.g. by an adhesive.

It is appreciated that the principles of the above-described connecting arrangement between the head tube 10 and the base frame 20 may be applied for connecting of frame elements one to the other or in structures or assemblies other than a bicycle of the kind described herein.

Those skilled in the art to which this invention pertains will readily appreciate that numerous changes, variations, and modifications can be made without departing from the scope of the invention, mutatis mutandis.

The invention claimed is:

1. An assembly, comprising:
   a first cardboard assembly member;
   a second cardboard assembly member; and
   a connection arrangement that connects together the first and second cardboard assembly members, the connection arrangement including a set of first connector elements and a set of second connector elements;
   each of the first connector elements (i) having a first segment fixedly received within the first assembly member, (ii) having a second segment that projects from the first assembly member and received within the second assembly member, the second segment extending along a first longitudinal axis parallel to two parallel faces of the second assembly member;
   each of the second connector elements (i) extends along a second longitudinal axis normal to said first longitudinal axis; and (ii) being fully received within said second assembly member;
   the second segment of each of the first connector elements in said set of first connector elements comprising at least two recesses extending along said second longitudinal axis, at least two first connector elements of the set of first connector elements being disposed parallel to one another, with their corresponding recesses being aligned, such that a second connector element out of said set of second connector elements is received within at least two aligned recesses to thereby interlock the first and second connector elements.

2. The assembly of claim 1, wherein the cross-sectional shape of each of the recesses in the first connector elements corresponds in shape and size to the cross-sectional shape of the second connector elements received therein.

3. The assembly of claim 1, wherein the cross-sectional shape of the first or second connector elements taken perpendicular to the first or second longitudinal axis, respectively, is circular or oval.

4. The assembly of claim 1, wherein the first or the second connector elements are made of an organic material.

5. The assembly of claim 4, wherein the organic material is wood.

6. The assembly of claim 4, wherein the organic material is cardboard.

7. The assembly of claim 1, wherein the second assembly member is pre-formed with a first set of apertures configured for receiving therein the second segment of the first connector elements and a second set of apertures configured for receiving therein the second connector elements.

8. The assembly of claim 1, wherein the assembly comprises a cover member covering a portion of the first and the second assembly members.

9. The assembly of claim 1, wherein the first assembly member is a head tube of a bicycle and the second assembly member is a frame of the bicycle.

* * * * *